(12) United States Patent
Bloomer (10) Patent No.: US 9,540,066 B1
(45) Date of Patent: Jan. 10, 2017

(54) FOOT PEG ASSEMBLY FOR A SADDLE-TYPE VEHICLE

(71) Applicant: CRG Racing, LLC, Huntersville, NC (US)

(72) Inventor: Spencer J. Bloomer, Mooresville, NC (US)

(73) Assignee: CRG Racing, LLC, Huntersville, NC (US)

( * ) Notice: Subject to any disclaimer, the term of this patent is extended or adjusted under 35 U.S.C. 154(b) by 0 days.

(21) Appl. No.: 15/161,365

(22) Filed: May 23, 2016

Related U.S. Application Data (63) Continuation-in-part of application No. 14/988,874, filed on Jan. 6, 2016.

(51) Int. Cl.
*B62J 25/00* (2006.01)

(52) U.S. Cl.
CPC ..................................... *B62J 25/00* (2013.01)

(58) Field of Classification Search
CPC ....................................................... B62J 25/00
See application file for complete search history.

(56) References Cited

U.S. PATENT DOCUMENTS

| | | |
|---|---|---|
| 374,287 A | 12/1887 | Benfield |
| 4,638,682 A | 1/1987 | Michiyama |
| 5,826,900 A | 10/1998 | Steele |
| 6,339,972 B1 | 1/2002 | Paris |
| 6,663,129 B1 | 12/2003 | Smith |
| 7,287,773 B1 | 10/2007 | Stahel |
| 7,946,193 B2 | 5/2011 | Smith |
| 8,181,982 B1 * | 5/2012 | Ward ........................ B62J 25/00 280/163 |
| 8,256,788 B2 | 9/2012 | Matsushima et al. |
| 8,850,926 B2 | 10/2014 | Bruggemann et al. |
| 9,132,876 B2 | 9/2015 | Grose et al. |
| 2005/0012300 A1 | 1/2005 | Egan |
| 2008/0179859 A1 | 7/2008 | Boehmke et al. |
| 2009/0108560 A1 | 4/2009 | Mountz et al. |
| 2010/0175942 A1 | 7/2010 | Griep et al. |
| 2010/0187792 A1 | 7/2010 | Warren |
| 2015/0217826 A1 | 8/2015 | Parvey |

* cited by examiner

*Primary Examiner* — Tony Winner
(74) *Attorney, Agent, or Firm* — Nelson Mullins Riley & Scarborough LLP (57) ABSTRACT

A foot peg assembly for a saddle-type vehicle for supporting a rider's foot while seated or standing on the vehicle comprises a mounting bracket for affixation to a frame portion of the vehicle, and a foot peg supported pivotably on the mounting bracket. The foot peg has a base and a step integral with the base extending outwardly therefrom. The base is attached pivotably to the mounting bracket for pivoting movement of the step relative to the mounting bracket. The base and the mounting bracket have mutually complementary configurations which maintain a close spacing therebetween through the range of pivoting movement of the step to substantially close the mounting bracket from entry of debris when the vehicle travels over unpaved ground surfaces.

6 Claims, 10 Drawing Sheets

FOOT PEG ASSEMBLY FOR A SADDLE-TYPE VEHICLE

CROSS-REFERENCE TO RELATED APPLICATIONS

This is a continuation-in-part of co-pending U.S. patent application Ser. No. 14/988,874, filed Jan. 6, 2016, entitled FOOT PEG ASSEMBLY FOR A SADDLE-TYPE VEHICLE.

FIELD OF THE INVENTION

The present invention relates generally to saddle-type vehicles, and more particularly to foot pegs provided on the frames of such vehicles for supporting a rider's feet while seated or standing on the vehicle.

BACKGROUND OF THE INVENTION

As used herein, saddle type vehicles are intended to mean and to encompass any unenclosed vehicle which supports a rider in a position straddling a frame-mounted seat, including for example but without limitation two-wheeled vehicles such as bicycles and motorcycles and three-wheeled or four-wheeled vehicles such as so-called ATVs (all terrain vehicles).

Many such saddle-type vehicles are designed and intended for, and commonly used in, so-called off-road work, recreational and racing activities over unpaved trails and undeveloped terrain. As one example, motocross races between competing motorcycles follow winding, hilly and sharply turning off-road courses over undeveloped raw terrain.

During a motocross race, the soil of the race course typically becomes agitated and churned as competitors operate their motorcycles at high speeds and take turns at extreme angles. Off-road motorcycles used in motocross races are provided with foot pegs mounted to opposite sides of the vehicle frame, which riders use not just as foot rests but also as standing supports to assist in leaning and steering the motorcycles. The foot pegs are typically pivoted and spring-loaded to yield to any contact with the terrain under such conditions and, then to automatically spring back into place. Unfortunately, however, mud, dirt and other debris can be thrown into the pivot mounting locations for the foot pegs which may hinder or even completely overcome the ability of the foot pegs to spring back into proper operating position.

While this problem has been known for some time, a satisfactory solution has yet to be developed. In some off-road motorcycles, a deflector may be mounted forwardly of the foot pegs to attempt to intercept dirt, mud and debris thrown toward the foot pegs. Such deflectors may partially mitigate but are unable to prevent debris from entering the mounting locations for the foot pegs, so at best deflectors only somewhat delay the effects of debris.

SUMMARY OF THE INVENTION

The present invention proposes to address the aforementioned problem by providing a foot peg assembly for saddle-type vehicles which has a particular configuration of components intended to substantially close the pivot mounting of the foot peg assembly from entry of mud, dirt and debris.

Briefly summarized, the foot peg assembly of the present invention basically comprises a mounting bracket for affixation to a frame portion of a saddle-type vehicle, and a foot peg supported pivotably on the mounting bracket. The foot peg has a base and a step integral with the base extending outwardly therefrom, the step being configured for resting or weight-bearing support thereon of the vehicle rider's foot. The base is attached pivotably to the mounting bracket for pivoting movement of the step relative to the mounting bracket. In accordance with the invention, the base and the mounting bracket have mutually complementary configurations to maintain a close spacing therebetween through the range of pivoting movement of the step so as to substantially close the mounting bracket from entry of debris when the vehicle travels over unpaved ground surfaces.

In contemplated embodiments of the invention, the mounting bracket may have spaced apart walls defining a mounting enclosure, with a support rod and a guide rod extending in parallel relation to one another through the mounting enclosure between the walls. The base may have a hub portion disposed rotationally about the support rod for unitary pivoting movement of the base and the step relative to the mounting bracket and may also have a guard portion extending from the hub portion about the guide rod for movement thereabout integrally with pivoting movement of the hub portion. The hub and guard portions of the base and the walls of the mounting bracket may have mutually complementary and closely spaced configurations to deter entry of debris into the mounting bracket when the vehicle travels over unpaved ground surfaces.

According to additional contemplated features of the invention, a spring may be disposed between the mounting bracket and the base of the foot peg for urging the foot peg into a normal riding disposition with the step extending laterally outwardly from the mounting bracket and being yieldable for pivoting movement of the step inwardly toward the mounting bracket. The guard portion of the base may be hook-shaped for extension about the guide rod. Alternatively, the guard portion of the base may comprise a slot through which the guide rod extends. One of the walls of the mounting bracket may include a shoulder extending within the mounting enclosure into adjacent relationship to the guard portion.

In a contemplated embodiment, the foot peg assembly may be mounted to the frame of a motorcycle as a preferred form of saddle-type vehicle.

DETAILED DESCRIPTION OF THE INVENTION

Figure 1:
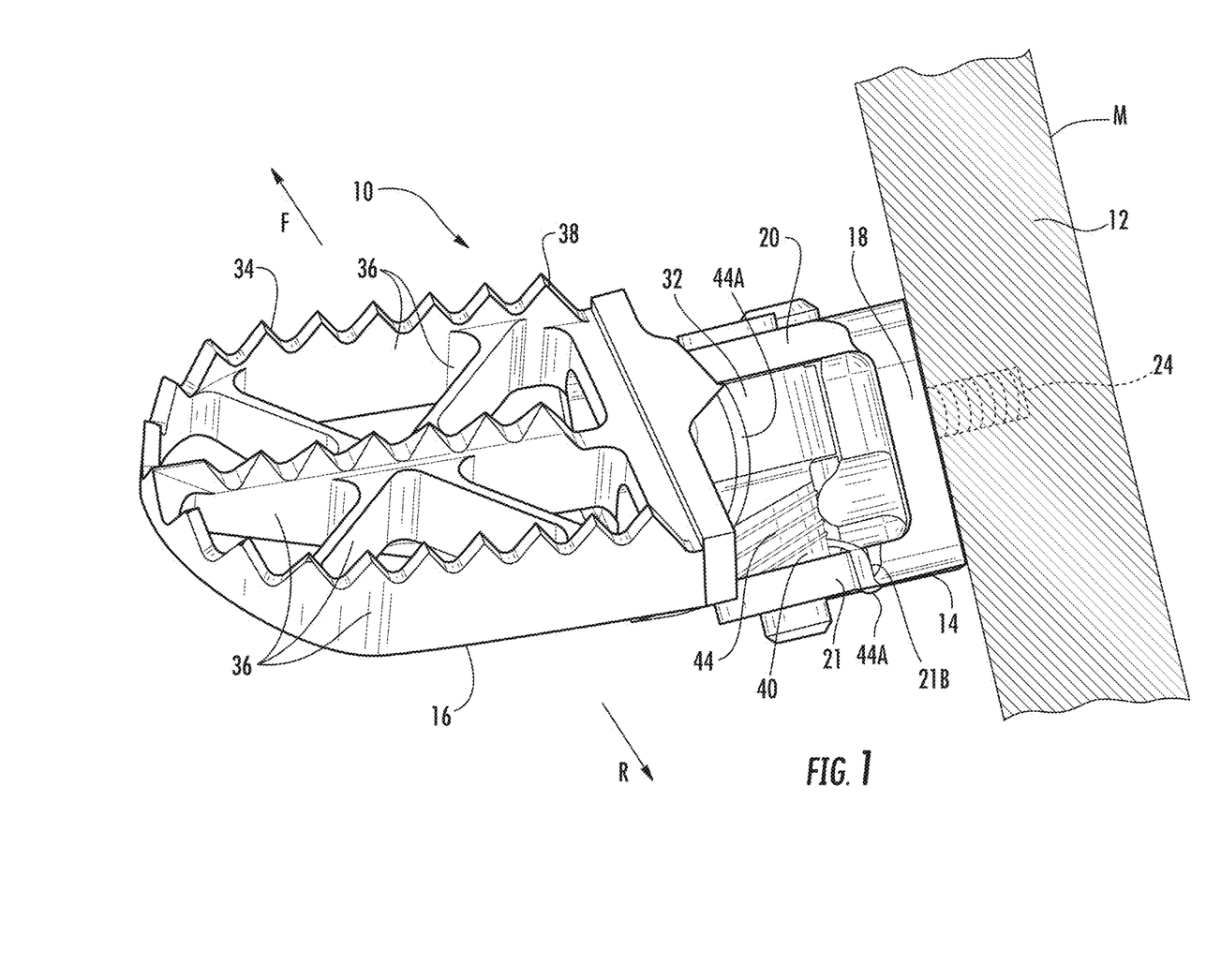
FIG. 1 is a top rear perspective view of a foot peg assembly in accordance with one contemplated embodiment of the present invention.
Figure 2:
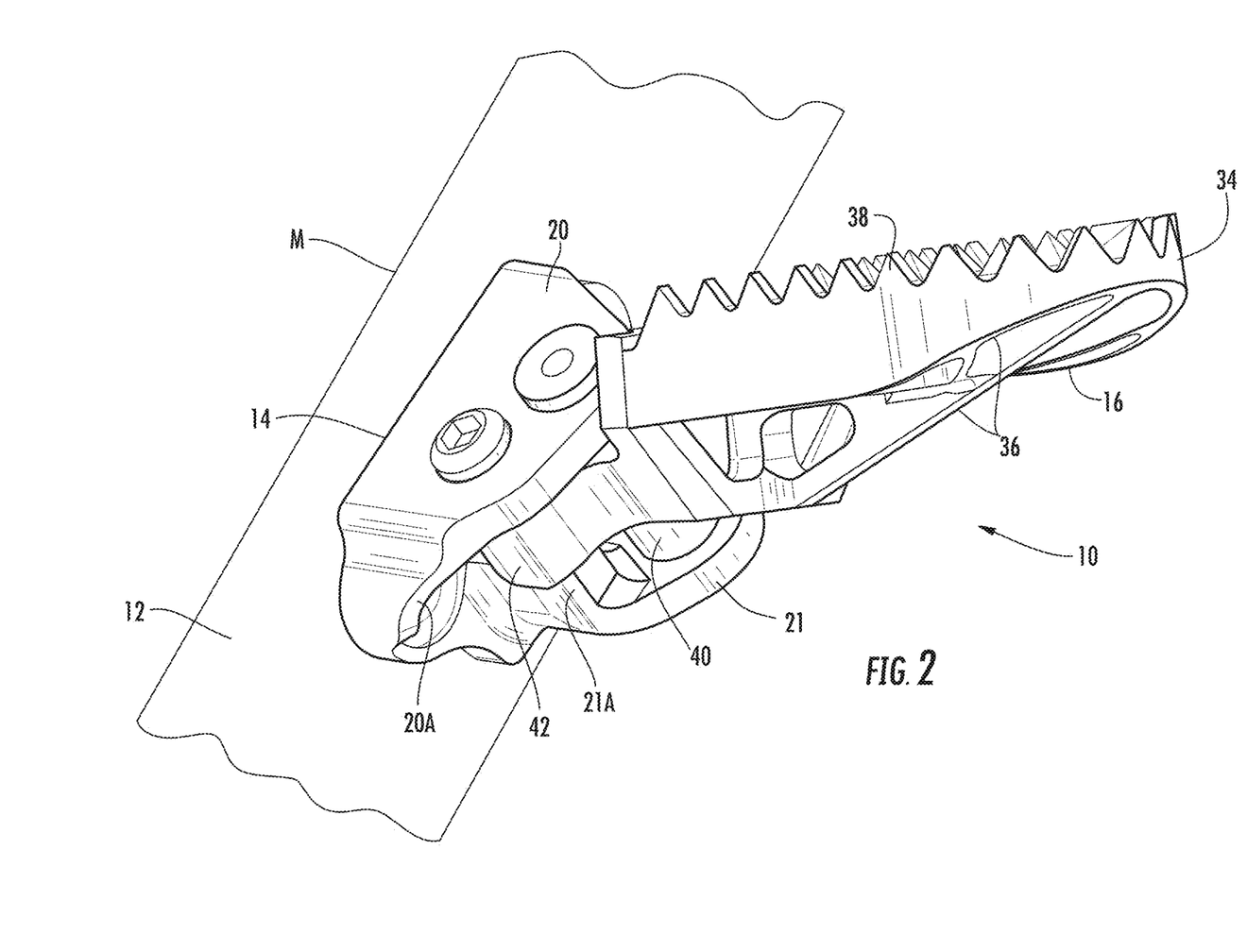
FIG. 2 is a front perspective view of the foot peg assembly of FIG. 1.

Referring now to the accompanying drawings and initially to FIGS. 1 and 2, a representative embodiment of a foot peg assembly in accordance with the present invention is indicated generally at 10 as mounted on the frame 12 of an off-road type motorcycle M. The forwardly facing direction of the frame 12 toward the front motorcycle wheel is indicated at F and the rearwardly facing direction of the frame toward the rear motorcycle wheel is indicated at R. The motorcycle M may be of any conventional construction, the various components and configuration of which are commonly known and understood and therefore are not otherwise shown or indicated.

The foot peg assembly 10 basically comprises two main components, a mounting bracket 14 affixed to the motorcycle frame 12 and a foot peg 16 supported pivotably on the mounting bracket 14. In the drawings of FIGS. 1 and 2, only a single foot peg assembly 10 is shown, but as will be readily understood by those knowledgeable and skilled in the relevant art, the motorcycle M is equipped with two identical such foot peg assemblies 10 mounted in mirror image relationship to opposite sides of the frame 12.

Figure 3:
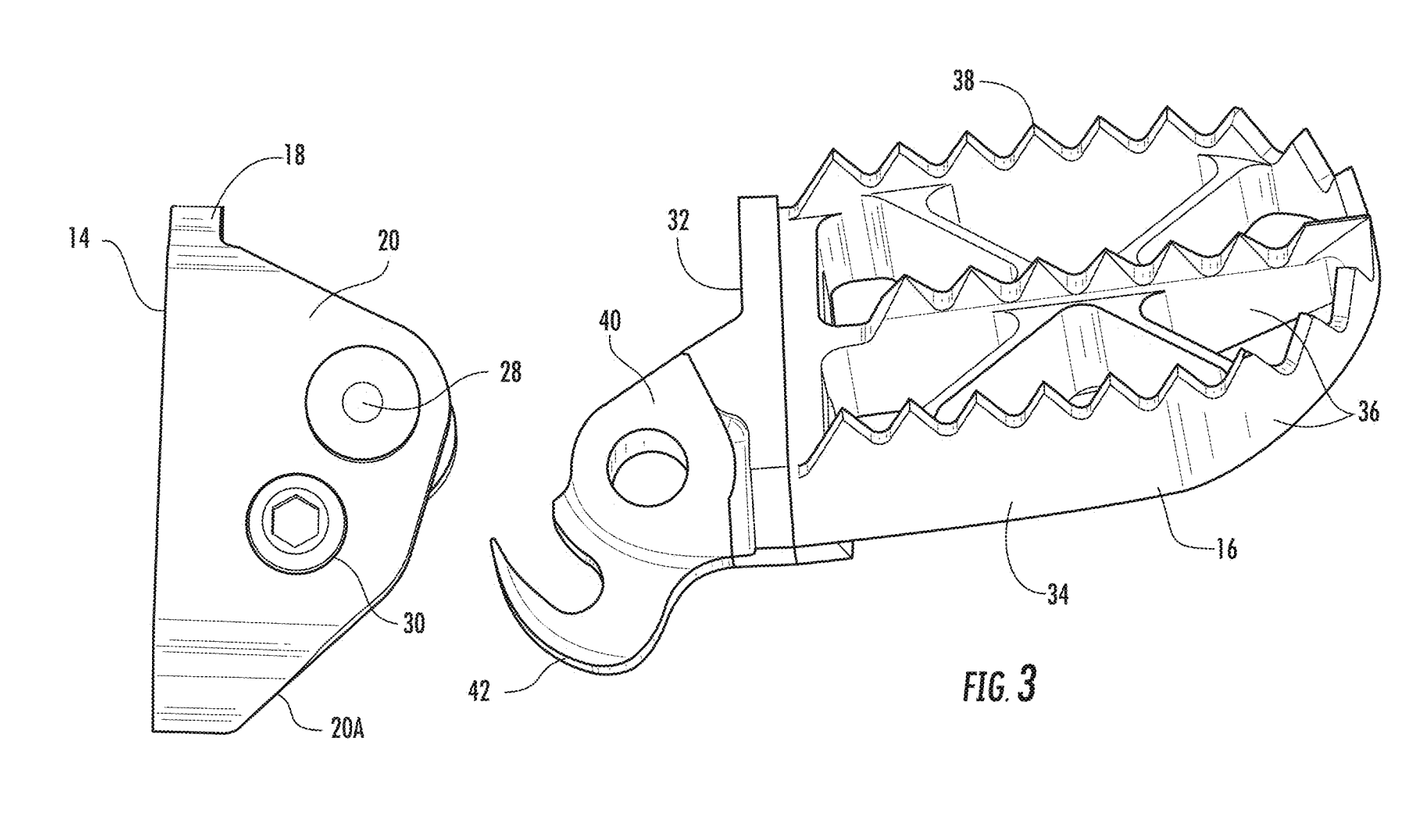
FIG. 3 is another front perspective view of the foot peg assembly of FIGS. 1 and 2, in exploded form.
Figure 4:
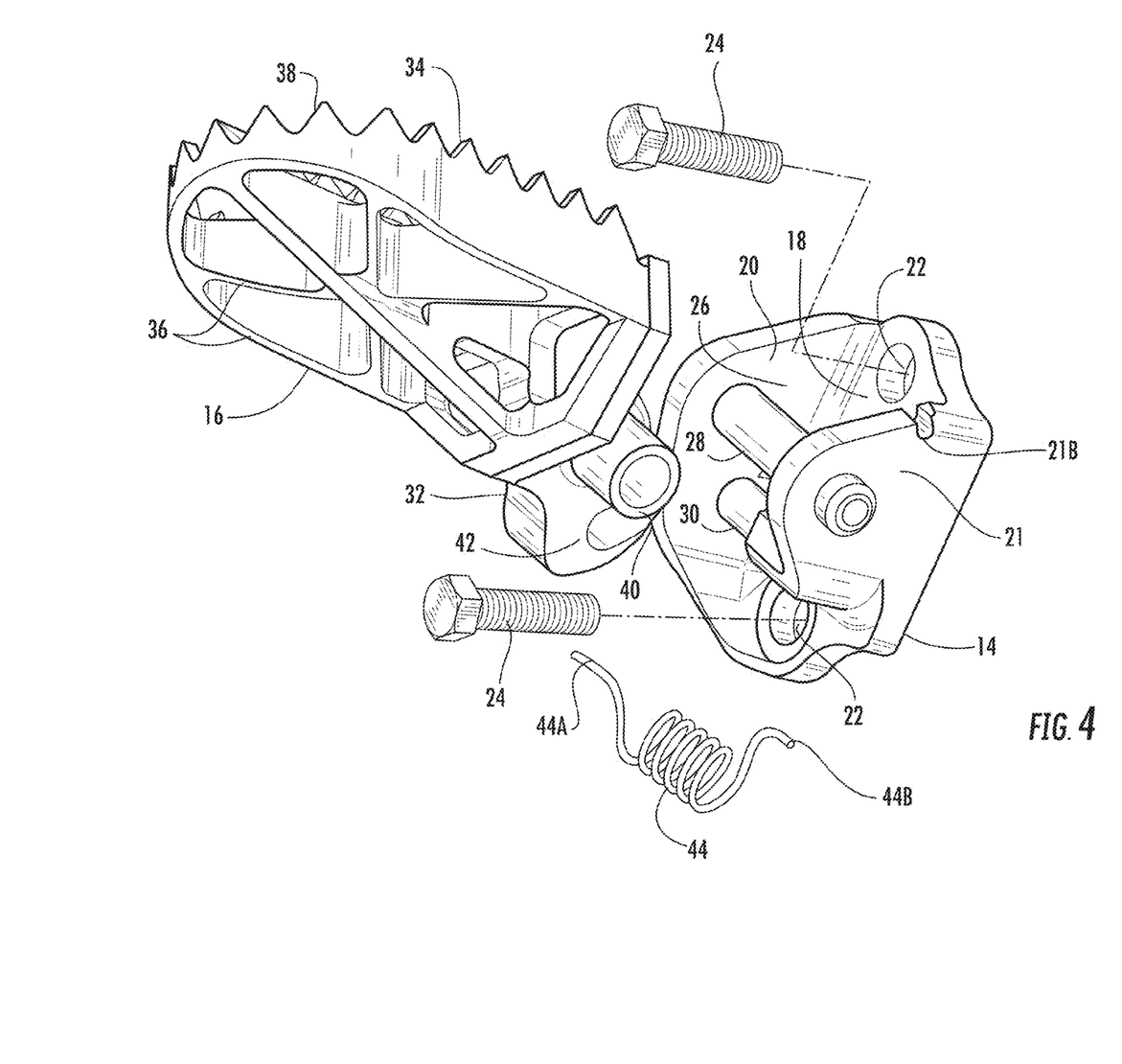
FIG. 4 is another rear perspective view of the foot peg assembly of FIGS. 1-3, in exploded form.
Figure 5:
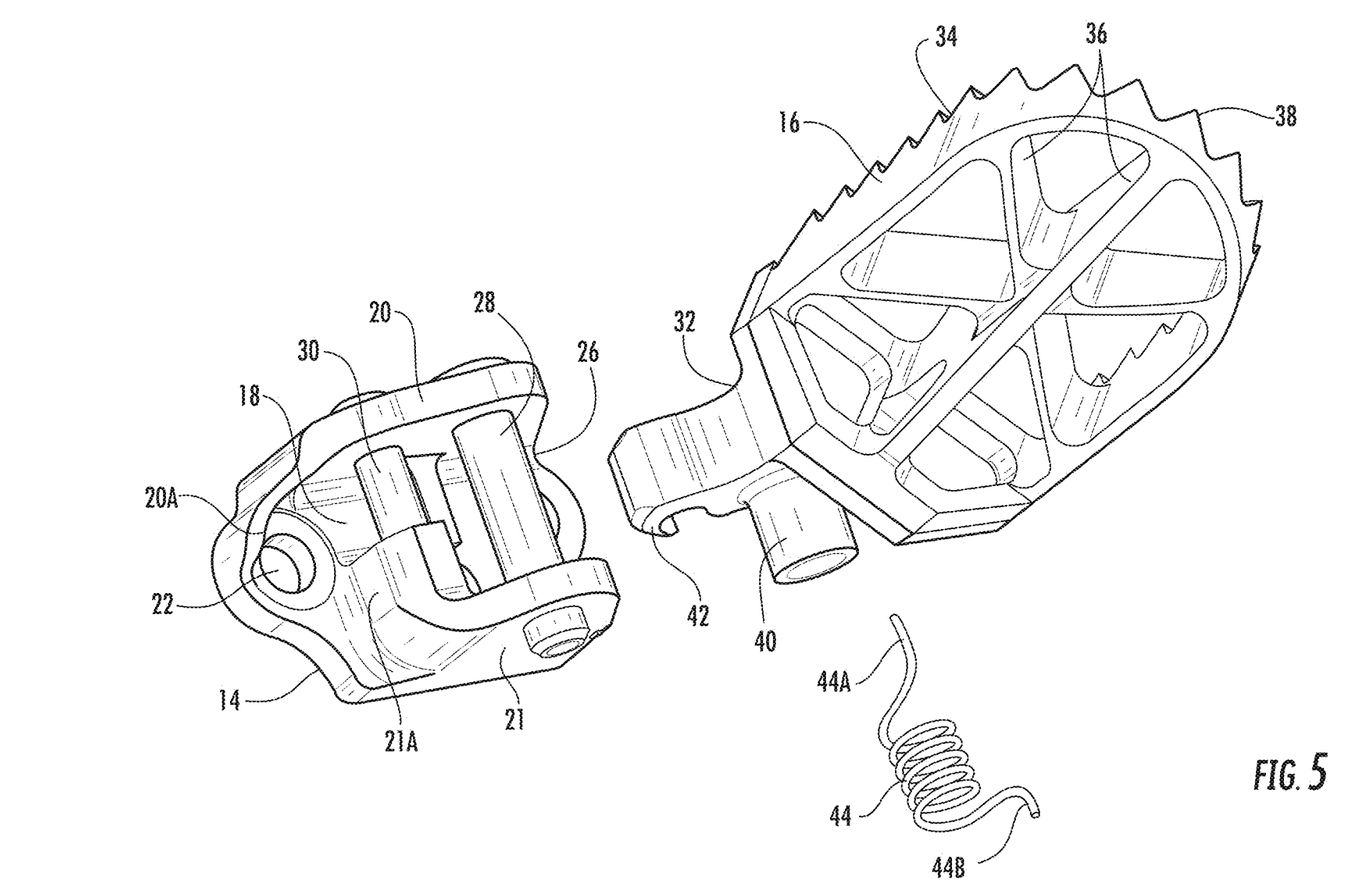
FIG. 5 is another exploded view of the foot peg assembly of FIGS. 1-4, from a bottom perspective.
Figure 6:
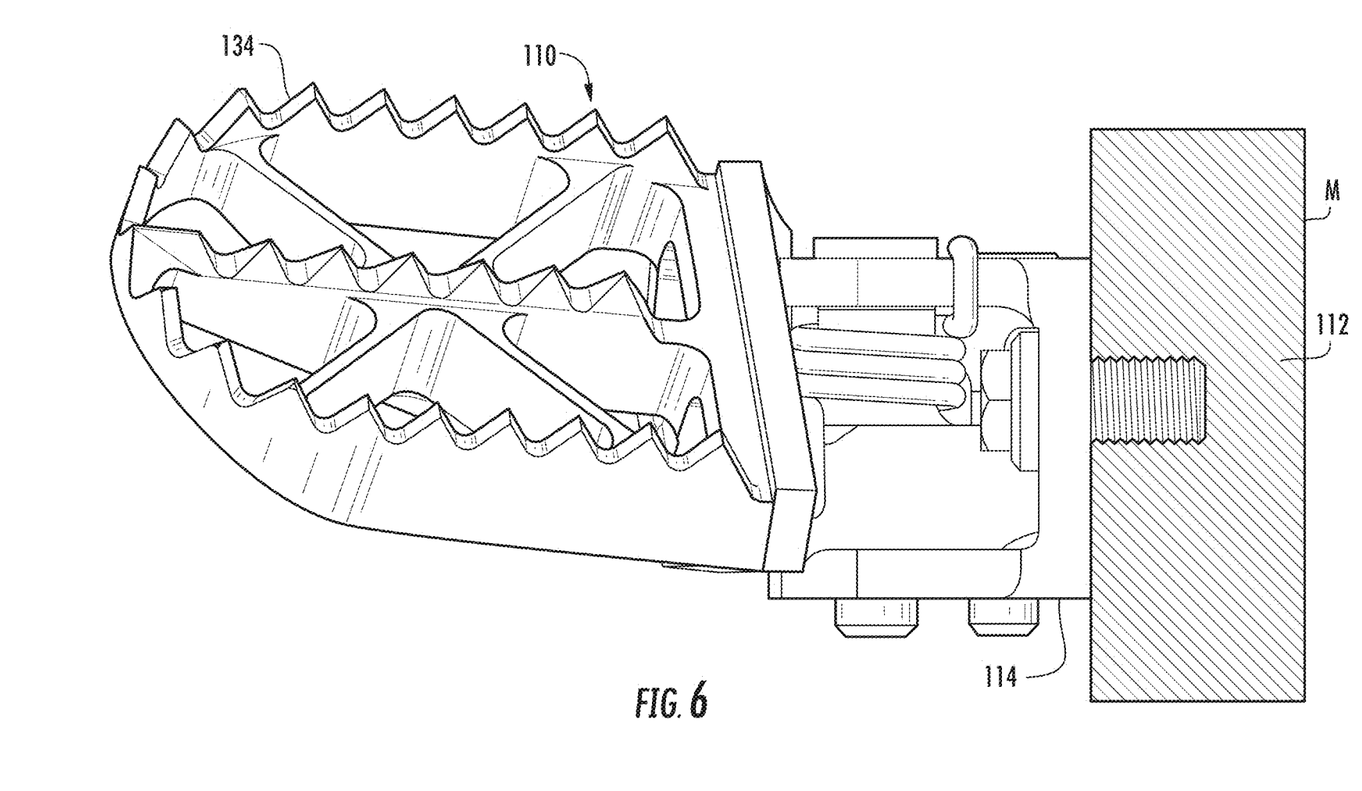
FIG. 6 is a top rear perspective view of a foot peg assembly in accordance with a second contemplated embodiment of the present invention.
Figure 7:
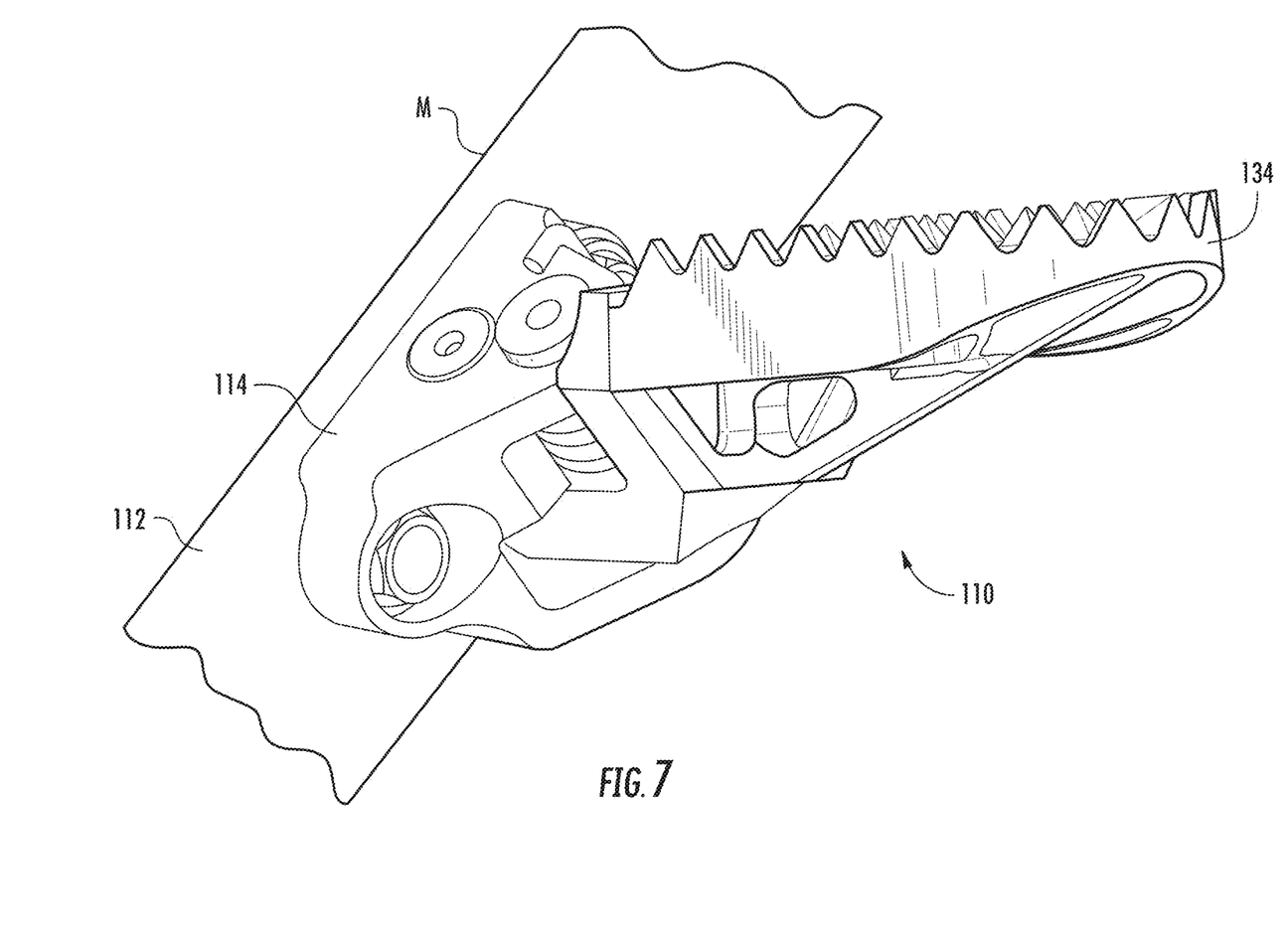
FIG. 7 is a front perspective view of the foot peg assembly of FIG. 6.
Figure 8:
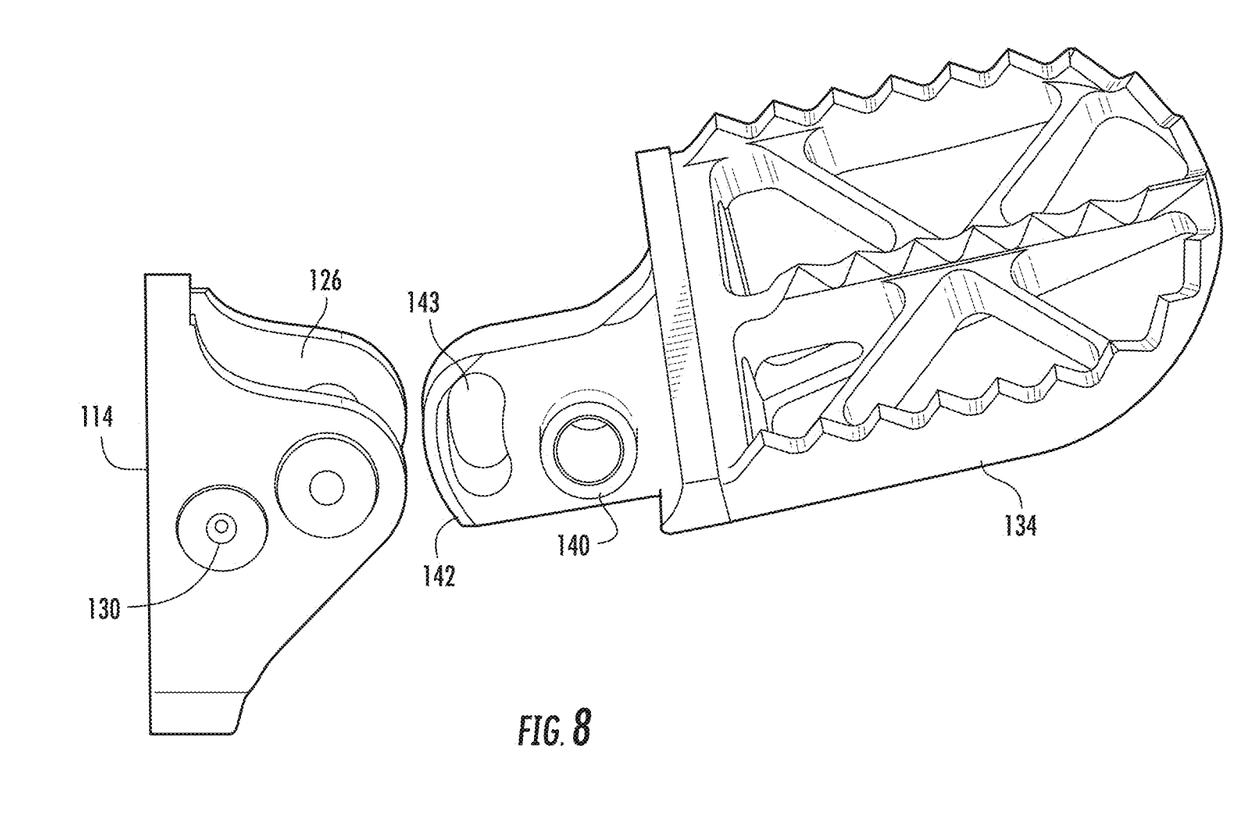
FIG. 8 is another front perspective view of the foot peg assembly of FIGS. 6 and 7, in exploded form.
Figure 9:
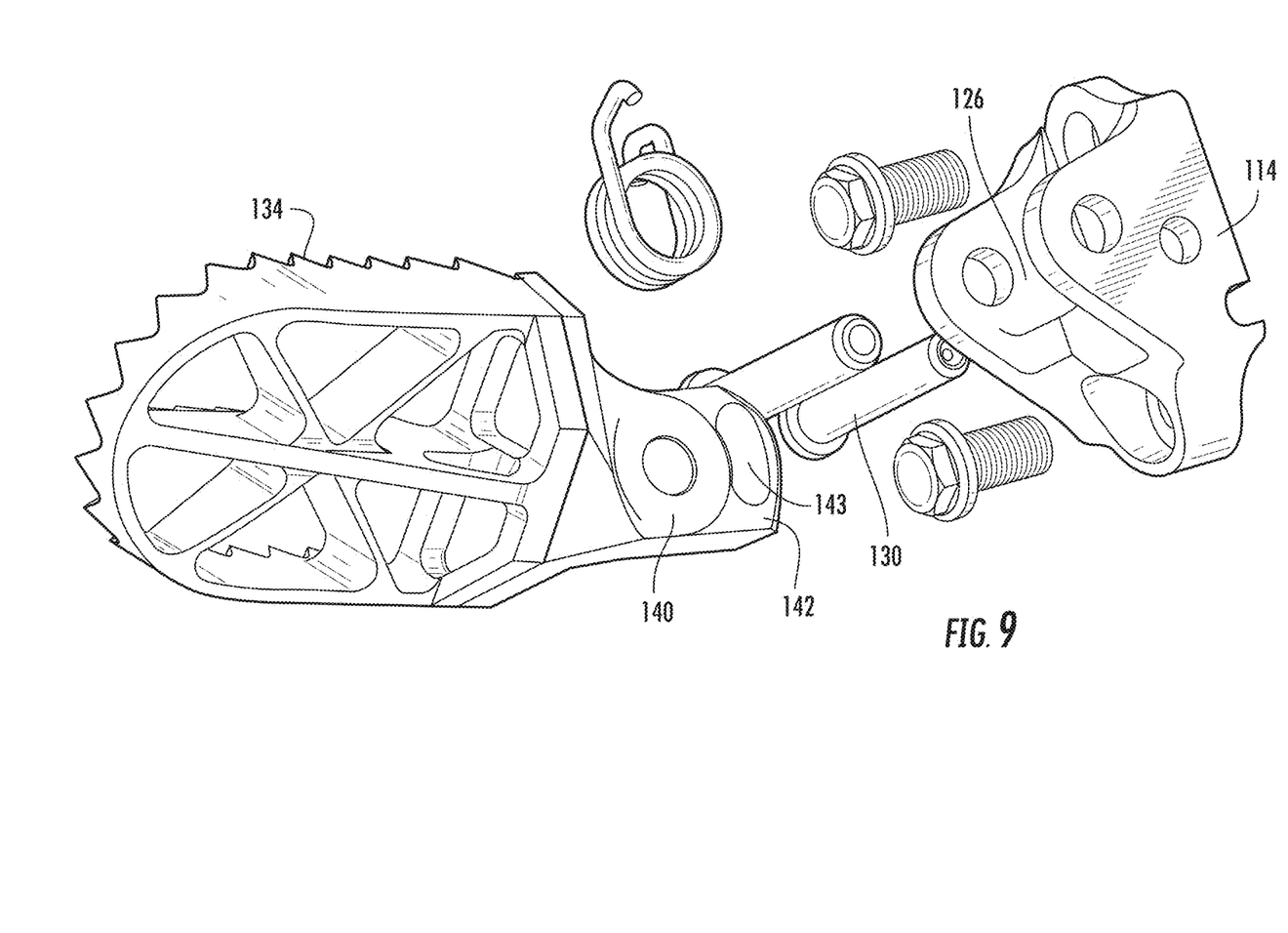
FIG. 9 is another rear perspective view of the foot peg assembly of FIGS. 6-8, in exploded form.
Figure 10:
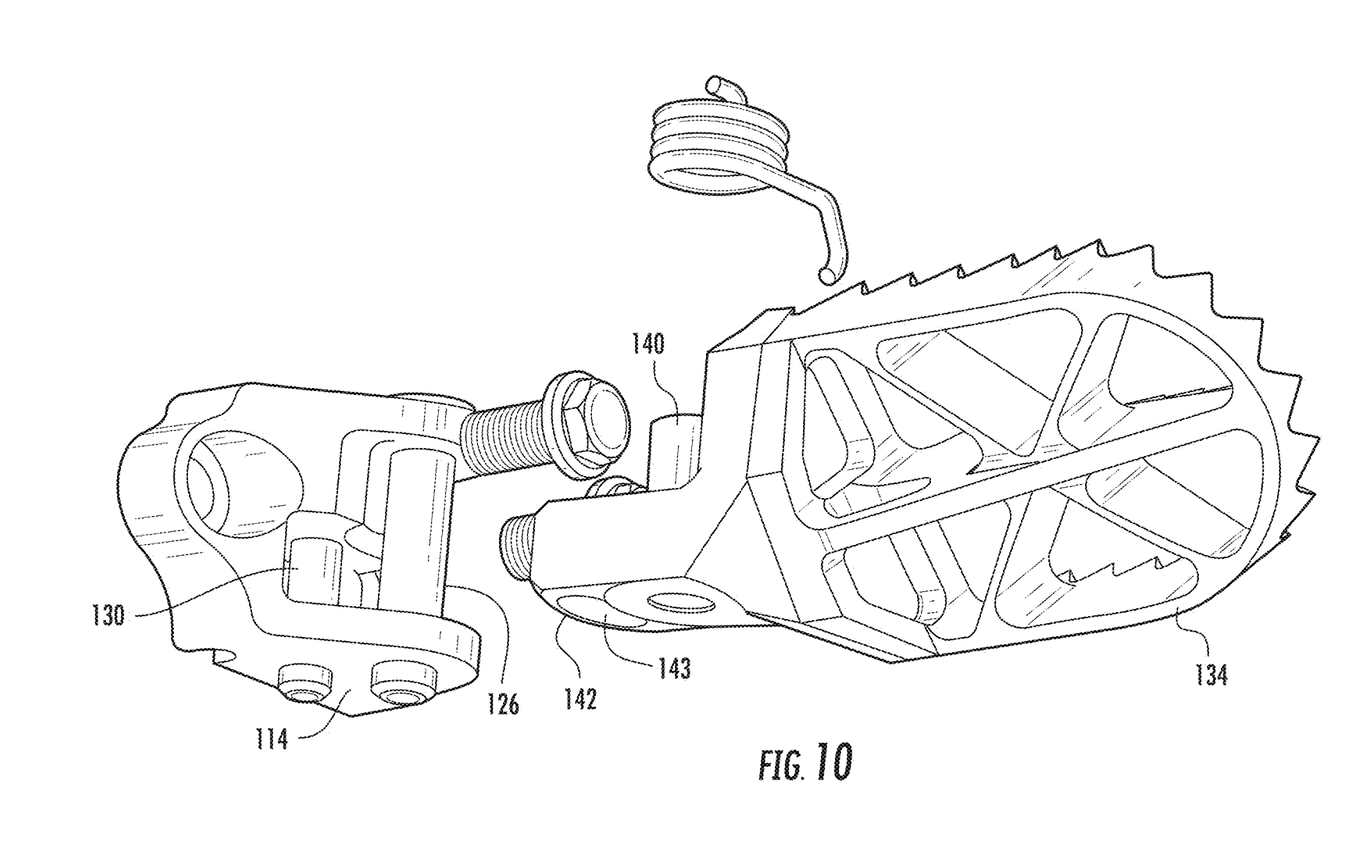
FIG. 10 is another exploded view of the foot peg assembly of FIGS. 6-9, from a bottom perspective.

The particular respective configurations of the mounting bracket 14 and the foot peg 16 may best be seen and understood with additional reference to FIGS. 3-5. The mounting bracket 14 is of a generally U-shaped configuration having a flat rear wall 18 from which opposing side walls 20, 21 extend in upstanding spaced-apart facing relationship. The rear wall 18 is formed with mounting holes 22 by which the bracket 14 is secured to the motorcycle frame 12 via bolts or other similarly suitable fasteners 24.

As so mounted, the side walls 20, 21 are disposed in an angular disposition to horizontal when the motorcycle frame 12 is in a vertical orientation and the side walls 20, 21 extend downwardly in the forward direction F of the frame 12, with the side wall 20 disposed relatively uppermost and the side wall 21 disposed relatively lowermost. Each side wall 20, 21 has a main extent of a substantially planar form in substantially parallel facing relation to one another. The sidewall 20 terminates in a forward end portion 20A partially curving and tapering inwardly toward the sidewall 21. The sidewall 21 includes a forward shoulder portion 21A projecting inwardly toward the sidewall 20. The rear and side walls 18, 20, 21 of the mounting bracket 14 thereby define a mounting enclosure 26 therewithin.

A cylindrical support rod 28 extends laterally between the main planar extents of the side walls 20, 21 rearwardly within the mounting enclosure 26 of the mounting bracket 14. A cylindrical guide rod 30 extends laterally between the side wall 20 and the shoulder portion 21A of the sidewall 21 forwardly within the mounting enclosure 26 of the mounting bracket 14 in parallel relation to the support rod 28.

The foot peg 16 comprises a mounting base 32 and a step 34 integral and rigid with respect to one another. The step 34 may be of any of various constructions and configurations forming an overall generally planar body configured suitably to serve as a resting or standing weight-bearing support for a motorcycle rider's foot. For example, as depicted in the illustrated embodiment, the step 34 may comprise an interconnected arrangement of perimeter and cross-members 36 forming an integrated rigid step structure, and may preferably also include upstanding teeth elements 38 for added frictional traction with respect to a shoe or boot worn by the motorcycle rider.

The mounting base 32 of the foot peg 16 includes a cylindrical sleeve-like hub portion 40 with a hook-shaped guard portion 42 extending outwardly from one end of the hub portion 40 at an offset from the axis of the hub portion 40. The hub portion 40 is disposed rotatably about and extends substantially the full length of the support rod 28 within the mounting enclosure 26 for supporting pivotable movement of the step 34 relative to the mounting bracket 14 through a range of motion toward and away from the motorcycle frame 12. In such mounted disposition, the guard portion 42 extends within the mounting enclosure 26 closely behind the forward portion 20A of the sidewall 20 and inwardly about the guide rod 30 between the main extent of the sidewall 20 and the shoulder portion 21A of the sidewall 21. The hook-shaped configuration of the guard portion 42 conforms to the outer circumference of the guide rod 30 and the offset orientation of the guard portion 42 relative to the hub portion 40 are selected to cause the guard portion 42 to move coaxially about the guide rod 30 as the guard portion 42 moves integrally with pivoting motion of the hub portion 40 and the step 34.

A coil spring 44 is disposed annularly about the hub portion 40 and has a projecting tang 44A at one end engaged about the base mounting portion 32 and a projecting tang 44B at the opposite end engaged in a retaining slot 21B in the sidewall 21 of the mounting bracket 14. In such disposition, the spring 44 acts between the mounting bracket 14 and the base 32 of the foot peg 16 for urging the foot peg 16 into a normal riding disposition wherein the step 34 extends laterally outwardly from the mounting bracket 14 for resting or standing support of the rider's foot but is yieldable to permit pivoting movement of the step 34 inwardly toward the mounting bracket 14 and toward the motorcycle frame 12, for example upon ground contact when the motorcycle is driven through a turn at an extreme angle to the ground.

As will be understood, the downwardly and forwardly inclined orientation of the side walls 20, 21 of the U-shaped mounting bracket 14 facilitate the desirable range of pivoting motion of the step 34 relative to the motorcycle frame 12, yet also orient the U-shaped mounting enclosure 26 of the bracket 14 to face toward the ground surface over which the motorcycle M travels. Even so, the sidewalls 20, 21 of the mounting bracket 14, particularly the tapering and curving forward wall portion 20A and the shoulder portion 21A, and the mounting base 32 of the foot peg 16, particularly the hub portion 40 and the guard portion 42, have mutually complementary orientations and configurations that maintain a relatively close spacing with one another through the full range of available pivoting movement of the step 34 and thereby substantially close the mounting enclosure 26 of the mounting bracket 14 from entry of debris even during pivoting movement of the step 34 as the vehicle travels over unpaved ground surfaces. In addition, the configuration and disposition of the guard portion 42 tends to expel any debris entering the enclosure 26 of the mounting bracket 14 as the guard portion 42 moves about the guide rod 30. As such, the foot peg assembly 10 of the present invention substantially resists collection of dirt, mud and other debris within the mounting bracket 14 even during operation of the motorcycle M in dirty and sloppy conditions, whereby the proper pivoting operation of the foot peg assembly 10 will be largely unaffected.

FIGS. 6-10 depict an alternative contemplated embodiment of a foot peg assembly in accordance with the present invention indicated generally at 110 as mounted on the frame 112 of an off-road type motorcycle M. As the foot peg assembly 110 of FIGS. 6-10 is substantially the same in structure and components to that of FIGS. 1-5, corresponding elements and components are identified by like reference numerals within the 100 series of numerals. The principal difference in the foot peg assembly 110 over the foot peg assembly 10 is that the guard portion 142 extending outwardly from the hub portion 140 defines a fully enclosed elongated slot 143 instead of an open hook, with the guide rod 130 extending through the slot 143. The slot 143 is of an arcuate configuration in conformity to the rotational arc defined by the movement of the guard portion 142 integrally with rotational movement of the hub portion 140 for pivoting of the step 134, with the width of the slot 143 conforming closely to the diameter of the guide rod 130 and the length of the slot 143 defining the permitted extent of pivoting movement of the step 134. The outer configuration of the guard portion 142 is complementary in configuration to and maintains a close spacing with the abutting and adjacent surfaces of the mounting bracket 114 through the range of pivoting movements of the guard portion 142 with the step 134. Thus, as in the embodiment of FIGS. 1-5, the mounting enclosure 126 of the mounting bracket 114 is substantially closed from entry of debris during pivoting movements of the step 134. The guard portion 142 serves to expel debris entering the enclosure 126 of the mounting bracket 114 as the guard portion 142 moves about the guide rod 130, while the enclosed configuration of the slot 143 further deters any tendency for debris to collect within the bracket 114.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A foot peg assembly for a saddle-type vehicle for supporting a rider's foot while seated on the vehicle, the foot peg assembly comprising:
    a mounting bracket for affixation to a frame portion of the vehicle, and
    a foot peg supported pivotably on the mounting bracket, the mounting bracket having spaced apart walls defining a mounting enclosure, with a support rod and a guide rod extending in parallel relation to one another through the mounting enclosure between the walls,
    the foot peg having a base and a step integral with the base extending outwardly therefrom, the step being configured for resting support thereon of the rider's foot,
    the base having a hub portion disposed rotationally about the support rod for unitary pivoting movement of the base and the step relative to the mounting bracket and a guard portion extending from the hub portion about the guide rod for movement thereabout integrally with pivoting movement of the hub portion,
    the hub and guard portions of the base and the walls of the mounting bracket having mutually complementary configurations maintaining a close spacing therebetween through a range of pivoting movement of the step to substantially close the mounting enclosure of the mounting bracket from entry of debris when the vehicle travels over unpaved ground surfaces.

2. The foot peg assembly for a saddle-type vehicle according to claim 1, further comprising a spring disposed between the mounting bracket and the base of the foot peg for urging the foot peg into a riding disposition with the step extending laterally outwardly from the mounting bracket and being yieldable for pivoting movement of the step inwardly toward the mounting bracket.

3. The foot peg assembly for a saddle-type vehicle according to claim 1, wherein the guard portion of the base is hook-shaped for extension about the guide rod.

4. The foot peg assembly for a saddle-type vehicle according to claim 1, wherein the guard portion of the base comprises a slot and the guide rod extends through the slot.

5. The foot peg assembly for a saddle-type vehicle according to claim 1, wherein one of the walls of the mounting bracket includes a shoulder extending within the mounting enclosure into adjacent relationship to the guard portion.

6. The foot peg assembly for a saddle-type vehicle according to claim 1, in combination with a motorcycle.

* * * * *